United States Patent
Lewis et al.

(10) Patent No.: US 7,051,093 B1
(45) Date of Patent: May 23, 2006

(54) QNX OPERATION SYSTEM NETWORK AUTO CONFIGURATION

(75) Inventors: Howard Lewis, Binghamton, NY (US); Rick A. Fry, Berkshire, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 1065 days.

(21) Appl. No.: 09/768,716

(22) Filed: Jan. 24, 2001

(51) Int. Cl.
*G06F 15/177* (2006.01)

(52) U.S. Cl. .............. 709/221; 709/220; 709/221; 709/222; 709/223; 709/224; 709/228

(58) Field of Classification Search ........... 709/220, 709/221, 223, 224, 222, 228
See application file for complete search history.

(56) References Cited

U.S. PATENT DOCUMENTS

| | | | | |
|---|---|---|---|---|
| 4,752,870 A | | 6/1988 | Matsumura ............. | 364/200 |
| 4,773,005 A | * | 9/1988 | Sullivan ................ | 710/9 |
| 5,109,484 A | | 4/1992 | Hughes et al. .......... | 395/200 |
| 5,146,568 A | | 9/1992 | Flaherty et al. .......... | 395/325 |
| 5,150,464 A | | 9/1992 | Sidhu et al. ............ | 395/200 |
| 5,226,079 A | * | 7/1993 | Holloway .............. | 713/177 |
| 5,257,378 A | | 10/1993 | Sideserf et al. .......... | 395/700 |
| 5,261,114 A | | 11/1993 | Raasch et al. ........... | 395/800 |
| 5,421,009 A | | 5/1995 | Platt ................... | 395/600 |
| 5,473,772 A | * | 12/1995 | Halliwell et al. ......... | 717/171 |
| 5,519,878 A | | 5/1996 | Dolin, Jr. .............. | 395/800 |
| 5,649,112 A | | 7/1997 | Yeager et al. ........... | 395/200.1 |
| 5,652,886 A | | 7/1997 | Tulpule et al. .......... | 395/652 |
| 5,666,293 A | | 9/1997 | Metz et al. ............. | 395/200.5 |
| 5,671,356 A | | 9/1997 | Wang .................. | 395/200.03 |
| 5,680,547 A | | 10/1997 | Chang ................. | 395/200.01 |
| 5,752,042 A | * | 5/1998 | Cole et al. ............. | 717/173 |
| 5,764,593 A | | 6/1998 | Turpin et al. ........... | 395/652 |
| 5,805,897 A | | 9/1998 | Glowny ................ | 395/712 |
| 5,812,857 A | | 9/1998 | Nelson et al. ........... | 395/712 |
| 5,838,907 A | | 11/1998 | Hansen ................ | 395/200.5 |
| 5,872,968 A | | 2/1999 | Knox et al. ............ | 395/652 |
| 5,878,257 A | | 3/1999 | Nookala et al. .......... | 395/652 |
| 5,960,189 A | * | 9/1999 | Stupek, Jr. et al. ....... | 717/169 |
| 6,009,274 A | * | 12/1999 | Fletcher et al. .......... | 717/173 |
| 6,131,117 A | * | 10/2000 | Clark et al. ............ | 709/223 |

\* cited by examiner

*Primary Examiner*—William M. Treat
*Assistant Examiner*—Mohammad O. Farooq
(74) *Attorney, Agent, or Firm*—Perkins Smith & Cohen LLP; Jacob N. Erlich; Peter J. Borghetti

(57) ABSTRACT

A network of computers communicate with each other and with a single system manager computer in accordance with the QNX operating system to perform a series of related tasks. When computers at a number of sites running the operating system boot up, they have resident software that will read a hardware configuration switch that is external to the computer. After reading the switch, the hardware node ID is used as the host ID portion of the IP address. Once a network computer is configured with the correct IP address, communication with other computers on the network can begin. Each QNX node will access the System Manager hard disk to access executables and files using the SMB (Server Message Block) file sharing protocol. If the hardware node ID does not match the current software logic node ID as specified by the QNX system, then the proper QNX files will be retrieved from the System Manager and the QNX node will then reboot itself. At this point, each QNX node will execute the proper software by utilizing the unique logic node ID as a reference to load software to the node.

31 Claims, 3 Drawing Sheets

QNX OPERATION SYSTEM NETWORK AUTO CONFIGURATION

BACKGROUND OF THE INVENTION

This invention relates generally to the field of computers and, more particularly, to the networking of computers for performing related tasks.

In a computer network utilizing Ethernet communications, it is necessary to configure the computers in the network to establish communications with each other and perform functions unique to their locations within that network system. In the past, it was necessary to configure a new or a replacement computer when placing it in the system. This required effort by a skilled system administrator. Additionally, computers already in the system would need to be reconfigured in order to communicate with any new or replacement computers.

As a result of the development of large systems which utilize computer controlled mechanisms, the control system required a network of computer nodes, which could communicate efficiently between themselves. Utilizing the QNX real time operating system, with its native networking environment (FLEET™, referenced in http://www.qnx.com/products/os/qnxrtos.html# networking) appeared to be the best alternative. A system manager computer was also attached to the network to provide a single point of interaction to most of the system functions. This manager computer was primarily to provide the operator with a Graphical User Interface (GUI) which would display the system status, allow the operator to start and stop the machine and also generate reports of past machine activity. The problems associated with such a system, however, is ease of maintainability, software installation, network configuration and hardware maintainability.

It is therefore an object of this invention is to provide a system of associating a list of tasks with a specific software for performing the specific task It is another object of this invention to provide a system in which each node determines what location ID is to be used to download the appropriate application software to perform the task required at that location.

SUMMARY OF THE INVENTION

The objects set forth above as well as further and other objects and advantages of the present invention are achieved by the embodiments of the invention described hereinbelow.

For flexibility in machine configuration, and ease of maintainability (both from a software and hardware viewpoint,) the present invention utilizes the same controller for each section of the machine. Also, all software upgrades and configuration changes are performed from the master, with no direct interaction with each individual controller. Each controller has only a bare minimum of software installed on a Disk-on-Chip™ which would allow it to boot. This means that any controller for this machine could be swapped for any other controller (reducing the number of spares that would need to be maintained) and the machine would still function as intended. Each computer of a number of networked computers has an attached hardware controller unit for producing a hardware node ID.

Utilizing a specific hardware node ID, each computer can determine which node it is intended to act as, and which application or task program is needed to be executed at its associated site. Each computer also has a logical ID associated with it, which is determined at boot time, as a component of the QNX operating system. Such logical node ID is compared with the hardware node ID of the computer, and should there be a mismatch, software reconfiguration occurs. During software reconfiguration, the appropriate operating system boot program is inserted into the computer having the proper logical node ID equal to the hardware node ID. The computer is then rebooted to load this portion of the operating system into memory.

For each computer, the logical node ID is also compared with the logical node ID associated with the physical node of the computer as indicated by a network through a mapping table, and with a physical address of the computer as indicated by a network adapter, to ensure that the each particular application program is being run at the proper physical site and to ensure that proper FLEET™ communications can be established between nodes. Also, the number of nodes that should be on the network as indicated by a system manager configuration file is compared with the number of nodes actually on the network to ensure that the proper number of nodes are network operative.

When computers running with the QNX operating system boot up, they have resident software that will read a configuration switch that is external to the computer. After reading the switch, the hardware node ID is used as the host ID portion of the IP address. Once the small board computer (the PC) is configured with the correct IP address, communications (via TCP/IP, not FLEET™) with other computers on the network can begin. Each QNX node will access the system manager hard disk to access executables and files using the SMB (Server Message Block) file sharing protocol. If the hardware node ID does not match the current software logic node ID as specified by the QNX system, then the proper QNX files will be retrieved from the system manager and the QNX node will then reboot itself. At this point, each QNX node will execute the proper software to perform the proper functions for its location as indicated by utilizing the unique logical node ID as a reference pointer to a configuration file on the system manager hard drive. The configuration file will indicate what software needs to be loaded by the node from the system manager hard disk. With the executables and configuration files on the system manager hard disk, future software and/or hardware upgrades can be implemented without changing resident software on a QNX node.

For a better understanding of the present invention, together with other and further objects thereof, reference is made to the accompanying drawings and detailed description and its scope will be pointed out in the appended claims.

DETAILED DESCRIPTION OF THE INVENTION

Figure 1:
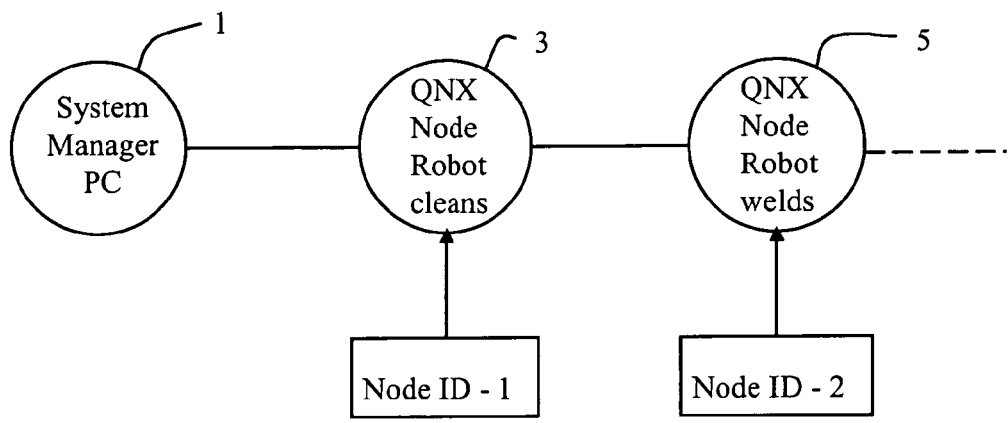
FIG. 1 is a schematic flow chart of the target system of this invention which illustrates the network connectivity for the invention as well as node ID input.

Reference is now made to FIG. 1 of the drawings which illustrates the network connectivity for the invention as well as the node ID inputs. The QNX operating system addresses each computer in its network as a node. Each node has a unique logical ID, starting at 1. The node ID is normally established at the time the operating system (OS) is installed on the computer, and stored in a ".boot" file in the root directory, which is the first file loaded for the operating system. If the node ID is to be changed, this file must be rewritten and the computer rebooted.

In order to better understand the overall operation of the invention in general terms, an example of a robotics assembly line, will be utilized for illustration but not for limitation, in connection with FIG. 1. The assembly line can include robots that obtain an assembly part, clean and orient it, weld it and test the integrity of the weld. As stated above, this example is only illustrative of the inventive concept and should not be used as a limitation for other uses of the invention.

In the illustrated application there will be a computer control system made up of the following: single system manager PC 1 coupled to all QNX nodes such as nodes 3 and 5 and at least several other nodes not shown. Computer node 3 has a PC, which will execute a first applications program to operate a robot, for example. At a first cleaning station site also denoted as 3, a first robot is provided for cleaning the assembly prior to welding it at station site 5. The applications control program in the first node PC 3 has the instructions to enable the first robot to effect the cleaning operation. This first application will be associated with a unique logical node ID (in a configuration on the system manager hard drive) assigned to station site 3.

Once the cleaning operation is complete, the assembly moves on, for example, a conveyor (not shown) to a second robot at station site 5 that welds seams on the assembly. This second robot is controlled by computer node 5 and therefore denoted by the same reference numeral. A second task application program in this node 5 computer controls the welding robot at station site 5. In a like manner, for example, a third robot (not shown) can be used to check the integrity of the weld and is controlled by a third computer node (not shown) As pointed out above, other operations and systems can be substituted for the robot example still within the confines of this invention. System manager 1 receives progress updates from the computer control system and stores the task application control software for each control computer.

As each control computer initializes, it reads an associated hardware switch that is set to a unique value which is used to identify the type of robot operation that the computer will have to control. This is the hardware node ID, which could be Node ID-1 for the first station site described. This allows the site PC to determine which application program is needed to be executed. The logical node ID for the welding task software application control program at site number 5 could be assigned logical Node ID-2 and so forth for the software application programs for subsequent tasks to be performed at the remaining station sites. As each computer node reads the value of the logical node ID off the associated hardware switch, it then loads the appropriate control software from the hard disk of the system manager PC that is associated with the logical node ID number. The logical node ID number is conveniently established by manually setting the hardware switches. Such action allows each control PC to be of the same type and configuration (meaning it would be the same assembly part number, or the same off the shelf computer, all configured exactly the same). As future requirements demand additional robot stations, the same control PC could be used and the specific application software would be downloaded from the system manager. Replacement of the control PCs would not require specialized system administration. The replacement control PCs can be physically connected and powered up.

As described above, each node has a specific set of tasks it must complete, dependent upon its site location within the control system. Therefore, there must be some way of associating a list of tasks with a site location, and a way for each node to determine which location it is responsible for monitoring and controlling. The mapping between logical and physical node ID's is performed by the network manager. The logical node ID must be associated with the physical ID of the nodes network adapter. In the above example, if the computer at the first node (cleaning site 3 in FIG. 1), was previously installed and configured for use at welding site 5, this erroneous situation must be corrected. This leads to a mismatch between the logical ID and the physical node Id which will be detected. The logical ID is then changed to match the hardware ID. Cleaning site 3 and welding site 5 will reboot and load and execute the appropriate application programs.

Figure 3:
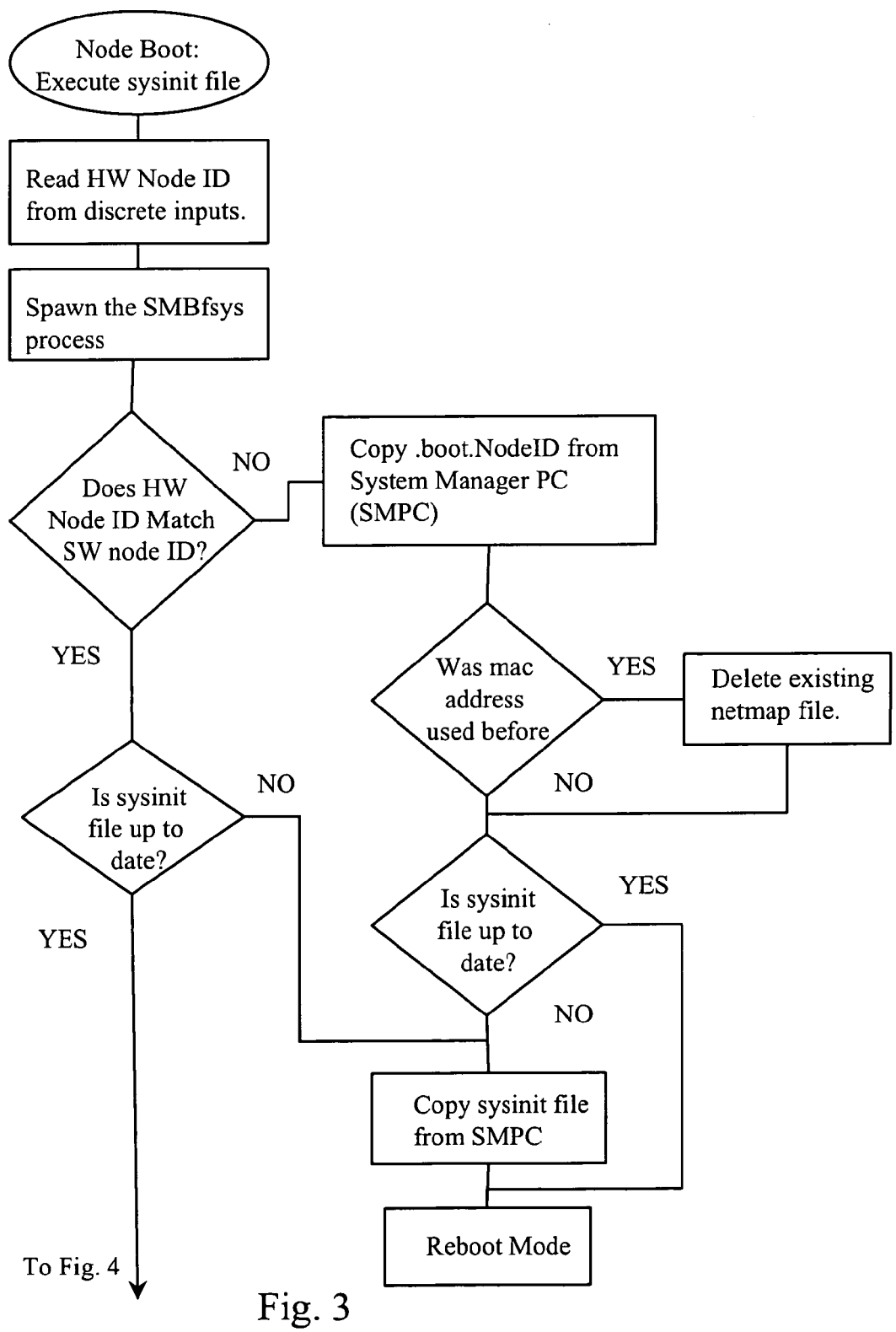
FIGS. 3 and 4 comprise a flow chart describing an algorithm used to implement the invention.
Figure 4:
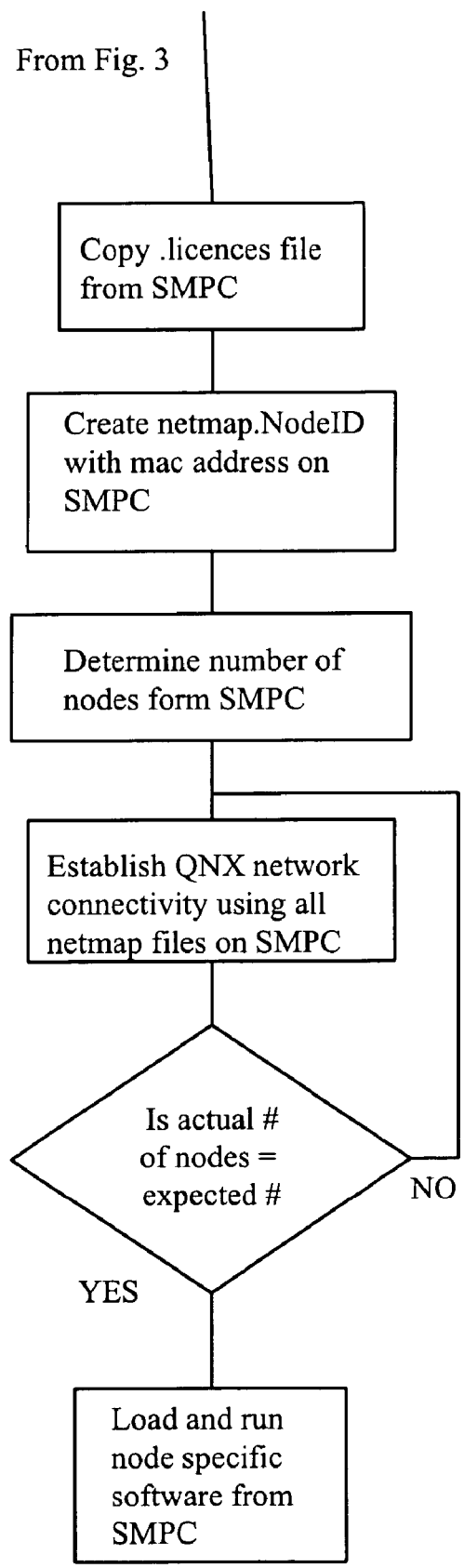

Every network card manufactured has an unique 12 digit hexadecimal (i.e. 0000C0 9A7F4C) address associated with it. Each node must know of its logical to physical ID mapping, as well as the mapping for all other nodes. The logical-to-physical mapping is usually contained in a file which is normally created at the operating system or OS installation. If this mapping is not correct (on all nodes,) FLEET™ communications between nodes cannot be established. If a node's ID must be changed, this file must be rewritten on all nodes. All nodes must then be rebooted, or at least have a system administrator level command run on each node as illustrated in the flow chart FIGS. 3 and 4.

Figure 2:
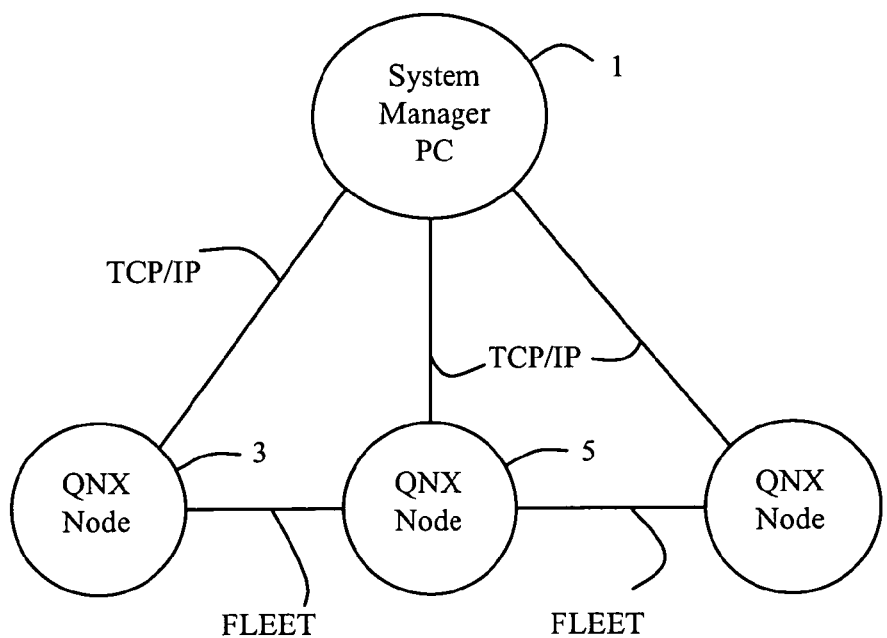
FIG. 2 is a schematic flow chart of the communication protocol between nodes in the target system of this invention.

Preferred embodiments of the present invention are based on network capabilities provided in the QNX operating system version 4.24 or higher. It also requires a system manager (or master) computer and its operating system, which is capable of supporting TCP/IP (Transmission Control Protocol/Internet Protocol) communications, with SMB (Server Message Block) or NFS (Network File System) file-sharing protocol, over an Ethernet connection as indicated in FIG. 2. The system manager would provide storage for system files and application software to be downloaded by the QNX nodes. QNX nodes are any PC-AT compatible platform capable of accepting node ID input via any input method.

The system files stored on the system manager 1 include node specific files, such as ".boot," and node independent files such as ".licenses" (QNX license file) and "sysinit". The system manager is also used for storage of configuration information such as the "netmap files". Application software stored on the system manager is based on the functional requirements of each node. One necessary configuration file maintained on the system manager is a file with a single numeric value stored in it to indicate how many nodes should be on the QNX network.

Each QNX node must also have a method of identifying which node it is intended to act as. This could be accomplished by installing the aforesaid hardware switch which could comprise a DI/DO (Digital Input/Digital Output) card and reading DIP (Dual Inline Pin) switches. As mentioned above, the switch settings represent a logical node ID that is unique for each node within the network.

As each QNX node initializes, or boots, it executes an initialization utility, called "sinit", which reads commands from a file called "sysinit.x" (where x is the node ID). First are commands which need to be executed on all nodes, including some high-level network initialization. Then, by executing a command to query the hardware, it is determined what the intended node ID is. The intended node ID (nid) is then used to establish TCP/IP communications by using it as the host ID portion of a TCP/IP address. (xxx.xxx.xxx.nid) Once this is accomplished, the system manager is contacted and its file system is mounted as a virtual device by the QNX node. If SMB is the file-sharing protocol, then this would be accomplished by spawning SMBfsys on the QNX node then executing mount_smb, otherwise, the mount would be accomplished by executing the mount_nfs command.

After initial communication is established, the hardware node id is compared with the logical node id contained within the ".boot file". If the two do not match, then steps must be taken to reconfigure the system to match the intended (or hardware) node id. These steps include copying the correct ".boot" file from the system manager and ensuring the "sysinit.nid" file (or a symbolic link) exists. If the hardware Node ID #1 calling for cleaning of the assembly in the computer at the first site, and the application program in this computer is logical ID #2 calling for welding of the assembly, the welding program must be replaced by the cleaning program.

Regardless of whether or not the IDs match, the "sysinit" file is compared with a copy maintained on the system manager. If there are differences, then the copy from the system manager is copied to the correct location on the local node. This allows for upgrades/changes to be implemented by modifying the file on the system manager alone, and the changes then getting propagated to the QNX nodes. If either the ".boot file" or "sysinit" file were changed, the QNX node is then automatically rebooted for the changes to take effect, and the above steps are repeated.

Once the hardware node ID and the logical node ID match, processing continues by querying the network adapter for its physical address. This information is then written to a file on the system manager named "netmap.nid", along with the necessary information for QNX to associate this physical ID and the nodes logical ID. At this point, all QNX licenses are also read into memory, from the system manager.

After this file is written, the netmap utility is executed, with input from all the netmap.nid files that exist on the system manager, to establish FLEET™ communications between nodes by establishing the logical to physical mapping for each node. When execution has completed, a check is done to establish how many nodes have been initialized. A comparison is then made with the value stored in the configuration file on the system manager to see if all necessary nodes are initialized. If they are not, then a loop is entered to re-execute the netmap command, after a slight pause, until the number of initialized nodes matches (or exceeds) the configuration file value as illustrated in the flow chart of FIGS. 3 and 4.

When all nodes are initialized, processing continues as each node downloads and executes node specific application software as indicated in files (similar to the "sysinit" file) on the system manager to indicate what tasks each needs to perform.

The following description relates to the preferred system for interconnecting the computer nodes and includes references to FLEET™ which as pointed out above was obtained from the internet at http://www.qnx.com/products/os/qnxrtos.html#Networking.

Regarding the FLEET™—High-performance Networking system for QNX, a unique feature of the QNX real-time operating system, FLEET™ creates a single homogeneous set of resources that you can access transparently, anywhere throughout the network. FLEET™ is an ultralight, high-speed networking protocol. Its innovative and feature-rich design turns network-connected machines into a single logical supercomputer. Because FLEET™ is built on the message-passing architecture of the QNX OS, it offers the ultimate in flexibility. FLEET™ delivers:

Fault-tolerant networking

Load-balancing on the fly

Efficient performance

Extensible architecture

Transparent distributed processing

Regarding fault-tolerant networking: If a cable or network card in one network fails, FLEET™ automatically re-routes data through another network. This happens on the fly, without involving application software, giving you automatic network fault-tolerance.

Regarding load-balancing on the fly: Network throughput is normally limited by the speed of the computer used and network hardware. With FLEET™, data can be transmitted over multiple networks simultaneously, allowing a user to double, triple, or even quadruple network bandwidth and throughput by placing multiple network cards in each computer and connecting them with separate cables. It is even possible mix different types of network cards (e.g. Ethernet, FDDI) in the same machine.

Regarding efficient performance: FLEET™ network drivers are built to make the most of networking hardware. For example, when sending large blocks of data over an Ethernet network from one process to another, impressive throughput is obtained.

Regarding extensible architecture: As a result of FLEET™, a QNX network provides unsurpassed flexibility. Networking processes are architecturally distinct from the OS, allowing a user to start and stop a networked node at any time. This means a user can add nodes to a network or remove them dynamically without reconfiguring the system. And, as a result of automatic network bridging, you can add different physical networks to your LAN as well.

Regarding transparent distributed processing: FLEET™'s networking processes are deeply integrated into the heart of message-passing and process-management primitives, making local and network-wide IPC one and the same. Since IPC is network transparent, a network of individual PCs appears as a single, seamless supercomputer. The end result is that the user never needs to modify the applications to communicate across the network.

Regarding file and term explanations: SMB (Server Message Block) is a file sharing protocol, which is used by a number of different servers (including: Windows NT, Windows 95, Windows for Workgroups, LAN Manager, and Samba). This protocol allows a QNX client to transparently access remote drives residing on such servers.

"The physical node ID is determined by the hardware. Network cards communicate with each other by specifying the physical node ID of the remote node they which to talk to. In the case of Ethernet and Token Ring, this represents a large number that is difficult for people and utilities to deal with. For example, each Ethernet and Token Ring card is shipped with a unique 48-bit physical node ID, conforming to the IEEE 802 standard." (This excerpt is taken from the QNX Operating System—System Architecture manual.)

The logical node ID: "To overcome the problems with physical node ID's, each QNX node is given a logical node ID. All QNX processes deal with logical node ID's. The physical node ID's are hidden from processes running on QNX. Logical node ID's simplify network and applications licensing. They also make it easy for some utilities that may wish to poll the network using a simple loop, where the logical nod ID goes from 1 to the number of nodes." (This excerpt is taken from the QNX Operating System—System Architecture manual.)

The mapping between logical and physical node ID's is accomplished by the network manager. The driver is given a physical ID by the network manager when asked to transmit data to another node. The logical node ID is typically assigned sequential numbers starting at 1. For example, a node with an Ethernet card may be given a logical node ID of 2, which is mapped to the physical node ID of 00:00:c0:46:93:30. Note that the logical node ID must be unique for all nodes across all interconnected QNX networks in order for network bridging to work."

Regarding the logical network ID: "The network ID identifies a particular logical network. A logical network is any hardware that allows a network driver to directly communicate with a network driver on another node."

(Excerpt taken from QNX Operating System—System Architecture manual) In the present invention, there is only one network in the control system. Therefore the logical network ID was set as 1 for all nodes.

Regarding the ".boot file": This is an executable file that runs when the computer is started. It is an image of the operating system. There is a dependency on the logical node ID in this file. That is why there are specific versions of this file on the system manager hard disk. Therefore as a QNX node compares the hardware node ID with the Logical node ID and they are different, a new .boot file must be obtained from the system manager and the QNX node restarted to execute the correct ".boot file".

Regarding the netmap file: "The netmap file is the default node and network ID mapping file used by the netboot and netmap utilities. This file defines the physical node ID's, the logical node ID's, and the logical network ID's (LAN) associated with each node." (Excerpt taken from QNX Operating System—Installation and Configuration manual)

An example file is shipped with QNX:

| #Logical | LAN | Physical |
|---|---|---|
| 1 | 1 | 0000c0 9a7f4c |
| 2 | 1 | 000629 d07830 |
| 3 | 1 | 0000c0 454e79 |

Regarding the sysinit file: "When QNX boots, an image (the ".boot" executable) composed of several QNX processes is loaded into main memory. The first process is boot. (Excerpt taken from QNX Operating System—Installation and Configuration manual)

The second process in the image is the Process Manager (Proc32), which contains the Microkernel. The last process in the image is the sinit utility. The sinit utility initiates the second phase of system initialization by starting a shell that executes commands a file. This file, the system initialization file (sysinit) contains commands that set up services for a machine.

Being able to start system services after boot is one of the benefits of QNX's modular architecture. The booted image typically contains only the few essential services needed to start all other required services. During a normal boot, sinit tries to boot from the "sysinit.node" file. Copies of the "sysinit" files are kept on the system manager. There are lines in the "sysinit" file that check to see if the copy on the system manager is different than the local copy on the QNX node. Therefore any updates to this file, as well as others, can be placed on the system manager station and are automatically utilized by the QNX nodes after the nodes are booted as illustrated in the flow chart of FIGS. 3 and 4.

Although the invention has been described with respect to various embodiments, it should be realized this invention is also capable of a wide variety of further and other embodiments within the spirit and scope of the appended claims.

What is claimed is:

1. A method of operating a plurality of networked computers each performing various functions comprising the steps of:
    (a) providing a first application computer at a first site for performing a first application task, a second computer at a second site for performing a second application task, and additional computers if and as needed for performing third and subsequent tasks at third and additional sites, each computer being coupled to the other computers via a network enabling communication between computers and each computer having a hardware unit for producing a hardware node ID identifying which node site each computer is intending to act as;

(b) providing a system manager means interconnected with the computers for downloading applications software thereto and for updating software therein;

(c) each computer having an application execution program having a logical node ID unique to the application to be executed by each computer at its associated site;

(d) comparing the hardware node ID of the computer for each computer with the logical node ID of the application execution program therein, and should there be a mismatch, inserting a new application execution program into the computer having an appropriate logical node ID equivalent to the hardware node ID;

(e) providing a network mapping means for correlating logical node IDs with appropriate associated physical site node IDs; and (f) comparing a logical node ID of an applications program in each computer with the logical node ID associated with the physical site node ID of the computer as indicated by the network mapping means, and in the event of a mismatch, inserting into the respective computer a correct applications program having an appropriate logical node ID as indicated by the network mapping means.

2. The method of claim 1 further comprising the step of: comparing the number of nodes that should be on the network as indicated by a system manager configuration file with the number of nodes actually on the network to ensure that the proper number of nodes are network operative.

3. The method of claim 2 further comprising the step of: setting switches associated with the hardware to effect the producing of said hardware node ID in step (a).

4. The method of claim 1 further comprising the step of: setting switches associated with the hardware to effect the producing of said hardware node ID in step (a).

5. The method of claim 1 further comprising the step of: restarting any computer in the event of any change in the application execution program or an applications program of that computer and repeating the steps of (d) comparing the hardware node ID and (f) comparing a logical node ID.

6. The method of claim 5 further comprising the step of: assuring that a unique network address for each computer is identified in the network mapping means.

7. The method of claim 6 further comprising the step of: downloading network address data from the network mapping means into each computer to support direct network communications between computers.

8. The method of claim 7 further comprising the step of: downloading a hardware node specific software program for execution by each computer.

9. The method of claim 8 further comprising the step of: implementing network upgrades and changes by making changes in the network mapping means and repeating said step of (f) comparing a logical node ID.

10. The method of claim 7 further comprising the step of: implementing network upgrades and changes by making changes in the network mapping means and repeating said step of f) comparing a logical node ID.

11. The method of claim 6 further comprising the step of: implementing network upgrades and changes by making changes in the network mapping means and repeating said steps of f) comparing a logical node ID.

12. The method of claim 5 further comprising the step of: implementing network upgrades and changes by making changes in the network mapping means and repeating said steps of f) comparing a logical node ID.

13. A method of operating a plurality of networked computers each performing various functions comprising the steps of:

(a) providing a first application computer at a first site for performing a first application task, a second computer at a second site for performing a second application task, and additional computers if and as needed for performing third and subsequent tasks at third and additional sites, each computer being coupled to the other computers via a network enabling communication between computers, and each computer having a computer node ID identifying means producing a computer node ID specifying which node site each computer is intending to act as;

(b) providing a system manager means interconnected with the computers for downloading applications software thereto and for updating software therein;

(c) each computer having an application execution program having a software logical node ID unique to the application to be executed by each computer at its associated site; and (d) comparing the computer node ID of the computer for each computer with the logical node ID of the application execution program therein, and should there be a mismatch, inserting a new application execution program into the computer having an appropriate software logical node ID equivalent to the computer node ID.

14. The method of claim 13 further comprising the steps of:

(e) providing a network mapping means for correlating software logical node IDs with appropriate associated physical site node IDs; and (f) comparing a software logical node ID of an applications program in each computer with the logical node ID associated with the physical site node ID of the computer as indicated by the network mapping means, and in the event of a mismatch, inserting into the respective computer a correct applications program having an appropriate software logical node ID as indicated by the network mapping means.

15. The method of claim 14 further comprising the step of: comparing the number of nodes that should be on the network as indicated by the system manager configuration file with the number of nodes actually on the network to ensure that the proper number of nodes are network.

16. The method of claim 14 further comprising the step of: restarting any computer in the event of any change in the application execution program or an applications program of that computer and repeating said steps of (d) comparing the hardware node ID and (f) comparing a logical node ID.

17. The method of claim 16 further comprising the step of: implementing network upgrades and changes by making changes in the network mapping means and repeating said step of f) comparing a logical node ID.

18. The method of claim 17 further comprising the step of: downloading a computer node specific software program for execution by each computer.

19. The method of claim 18 further comprising the step of: providing identical hardware units associated with each computer at each site, to facilitate flexibility in machine configuration and ease of maintainability.

20. The method of claim 13 further comprising the step of: comparing the number of nodes that should be on the network as indicated by the system manager configuration file with the number of nodes actually on the network to ensure that the proper number of nodes are network operative.

21. A method of operating a plurality of networked computers each performing various functions comprising the steps of:
(a) providing a first application computer at a first site for performing a first application task, a second computer at a second site for performing a second application task, and additional computers if and as needed for performing third and subsequent tasks at third and additional sites, each computer being coupled to the other computers via a network enabling communication between computers and each computer having means for producing a node ID code, identifying which node site each computer is intending to act as;
(b) providing a system manager means interconnected with the computers for downloading applications software thereto and for updating software therein;
(c) each computer having an application execution program having a logical node ID unique to the application to be executed by each computer at its associated site;
(d) comparing the node ID code of the computer for each computer with the logical node ID of the application execution program therein, and should there be a mismatch, inserting a new application execution program into the computer having an appropriate logical node ID equivalent to the node ID code;
(e) providing a network mapping means for correlating said logical node IDs with appropriate associated physical site node IDs; and
(f) comparing a logical node ID of an applications program in each computer with the logical node ID associated with the physical site node ID of the computer as indicated by the network mapping means, and in the event of a mismatch, inserting into the respective computer a correct applications program having an appropriate logical node ID as indicated by the network mapping means.

22. The method of claim 21 further comprising the step of: restarting any computer in the event of any change in the application execution program or an applications program of that computer and repeating said steps of
(d) comparing the hardware node ID and
(f) comparing a logical node ID.

23. The method of claim 22 further comprising the step of: downloading a node ID code specific software program for execution by each computer.

24. The method of claim 23 further comprising the step of: implementing network upgrades and changes by making changes in the network mapping means and repeating said step of (f) comparing a logical node ID.

25. A computer network system adapted to perform a plurality of different functions at respectively separate node site locations, comprising:
a plurality of separate node site computers, each intended to perform a different function at a separate node site location;
a communications network linking said plurality of computers;
separate node site identification means associated with each node site computer and adapted to produce a unique, respective node site identification corresponding to each separate node site location;
a separate execution file stored in each computer and having a logical node identification that is unique to functions to be performed in association with each respective operations file;
first operating instructions associated with each computer and adapted to compare the logical node identification of each execution file with said respective node site identification of each computer to determine a mismatch there between; and
second operating instructions adapted to use said network to insert into each computer having a mismatch, a new execution file having a logical node identification matching said respective node site identification.

26. The system of claim 25, further comprising a network mapping means adapted for correlating logical node identifications with said respective node site identifications.

27. The system of claim 26, further comprising third operating instructions associated with each computer and adapted to compare logical node identifications of one or more application files located in each computer with said respective node site identification as indicated by the network mapping means, and fourth operating instructions adapted to use said network to the insert into each respective computer, application files having a comparable logical node identification as indicated by said network mapping means.

28. The system of claim 27, further comprising fifth operating instructions associated with each computer and adapted to restart each computer in the event of an insertion of a new execution file or a new application file, and further adapted to subsequently re-initiate, said first and third operating instructions adapted to compare.

29. The system of claim 28, further comprising a system manager computer coupled to said network, and sixth operating instructions located in said system manager computer and adapted to download node site specific software to said node site computers using said network.

30. The system of claim 29, wherein said system is adapted for implementing software upgrades by making changes to said network mapping means and initiating said third operating instructions adapted to compare.

31. The system of claim 30, wherein said node site identification means are separate hardware switches connected to each machine.

* * * * *